United States Patent Office.

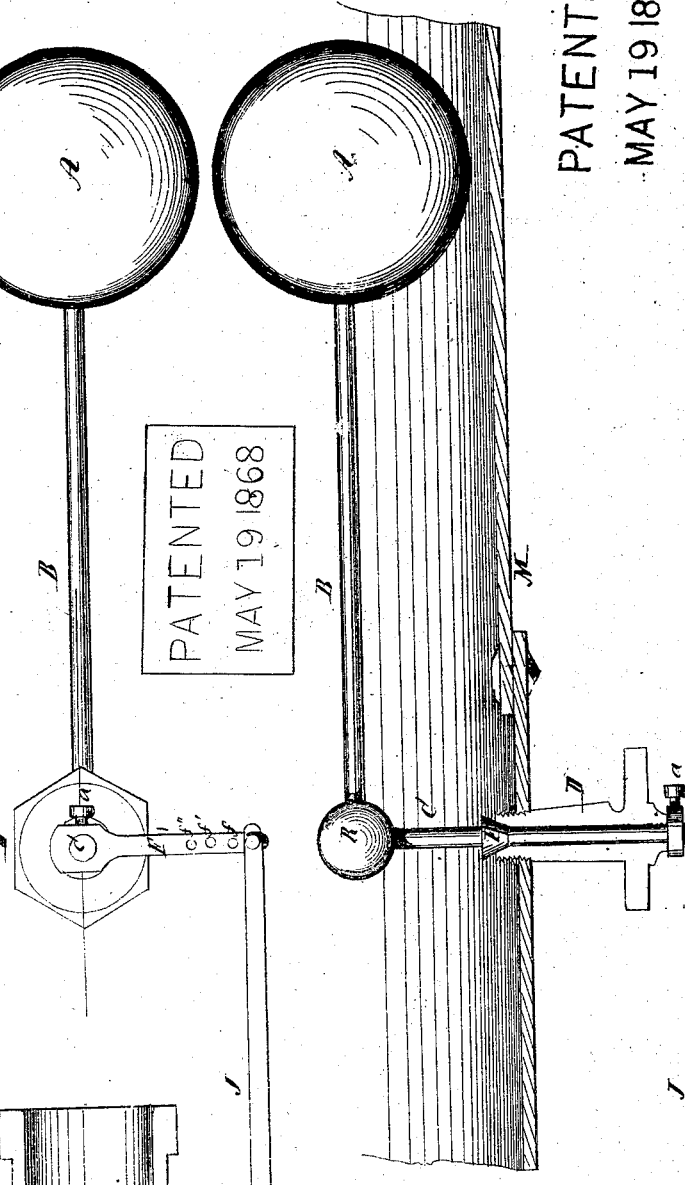
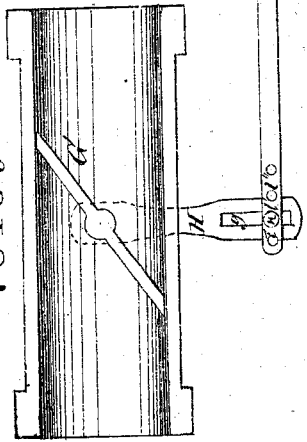
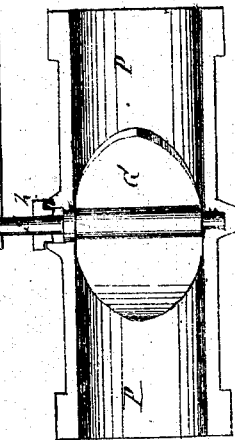

H. P. STAFFORD AND J. A. LEFORGEE, OF DECATUR, ILLINOIS.

*Letters Patent No. 78,150, dated May 19, 1868.*

IMPROVEMENT IN DEVICE FOR REGULATING THE SUPPLY OF WATER TO STEAM-GENERATORS.

*The Schedule referred to in these Letters Patent and making part of the same.*

TO ALL WHOM IT MAY CONCERN:

Be it known that we, H. P. STAFFORD and J. A. LEFORGEE, of Decatur, in the county of Macon, and State of Illinois, have invented a new and improved Supply-Gauge for Boilers; and we do hereby declare that the following is a full, clear, and exact description thereof, which will enable those skilled in the art to make and use the same, reference being had to the accompanying drawings, forming part of this specification, in whi h—

Figure 1 is a side elevation of our improvement, with the valve and its pipe shown in section.

Figure 2 is a plan of the same, the valve, pipe, and box being shown in horizontal section.

Similar letters of reference indicate corresponding parts.

This invention relates to an improvement for regulating the supply of water in steam-boilers, and which acts automatically in maintaining the proper water-level within the same.

M is a section of boiler-plate.

D is a box, screwed into or otherwise secured to the said plate, at or near the lowest water-level allowed in practice.

C is a spindle, passing through the box, and turning freely within it.

E is a common conical valve, fitted tightly on the spindle, and seated in the inner end of the box D, for a purpose to be shown.

B is a shank, attached rigidly to the spindle by a solid ball, R, fitting tightly on both shank and spindle.

The shank is at or near a right angle with the spindle, and carries at its opposite end a hollow metallic ball or float, A, which rests upon the water, N, as shown, and rises and falls with the latter, thus vibrating the shank B, and partially rotating the spindle C, to which it is attached.

The valve E fits into a corresponding conical seat on the inner end of the box D, and is pressed firmly therein by the pressure of steam within the boiler, thereby dispensing with the use of a stuffing-box or other packing, for keeping the box steam-tight.

This valve is kept always ground tight, by the vibration of the spindle, when the ball A rises or falls with the change of water-level, together with the pressure of the steam against the valve.

To the exterior end of the spindle C is attached an arm, F, by means of a set-screw, $a$, as shown.

This arm has holes $f f' f''$, for attaching, with pivot-bolts through any one of them, a connecting-rod, J, for transmitting the motion resulting from the vibration of the ball A and its shank B, as aforesaid.

G is a valve, within a pipe, P, which represents the supply-pipe of the boiler, or any similar connection, to the hot-well tank or tender of a steamboat, stationary or locomotive boiler.

This valve has an elliptical perimeter, so that it shall fit the interior of the circular pipe P, when set at an angle within the same, as shown.

A stem, $s$, passes transversely through the valve, and the centre line of the vibration of the valve on this stem divides the plane of the former equally, whereby the said valve is held in equilibrium by the pressure of water within the pipe at all of its positions, and turns freely when the water is pressing against its rear face, at whatsoever angle it may be.

$h$ is a stuffing-box for the stem $s$.

H is an arm, on the same, having a slot, $g$, for the reception of a bolt, $n$.

The connecting-rod or link J, pivoted to the arm F, through any one of the holes $f f' f''$, is also pivoted to the arm H. The ball A and valve G are thus in connection, and their operation is as follows:

When the ball rises with the increase of water in the boiler, the valve closes correspondingly, and, at a certain point, entirely shuts off the supply of water. The fall of the water-level acts reversely, by opening the valve G. This action of the valve and float A maintains the water at nearly a constant uniform level.

When this supply-gauge is attached to locomotives it acts with peculiar advantage, for in ascending grades the head of water flowing back to the rear part of the boiler, at which place the float would be attached, raises the float A, thus shutting off the supply, and when descending a grade the reverse takes place.

It is the practice on all railroads to put on the supply-pumps at the full delivery when going down grade, and to shut them off entirely when ascending, the object being to economize the consumption of fuel.

Our improvement, as above shown, acts promptly and certainly in the same manner, and is therefore a desirable attachment to locomotives.

The slot $g$, in the arm H, with the holes $l\ l'\ l''$, in the rod J, and the holes $f\ f'\ f''$, in the arm F, are all for the adjustment of the connection, whereby the valve G can be made to respond with a greater or less degree of vibration, as circumstances may require.

The advantages of this invention, in addition to those already stated, consist in simplicity, facility of application, and the general economy of fuel resulting from the equable supply of water to which it conduces.

We claim as new, and desire to secure by Letters Patent—

The arrangement of the float A, stem B, solid ball R, spindle C, valve E, box D, perforated arm F, adjustable connecting-rod J, slotted arm H, stem $s$, and elliptical valve G, in the supply-pipe P, all constructed and operated as herein shown and described.

H. P. STAFFORD,
J. A. LEFORGEE.

Witnesses:
  ROBT. LEFORGEE,
  W. J. CHENOWETH.